United States Patent [19]

Wetzel et al.

[11] Patent Number: 5,428,534
[45] Date of Patent: Jun. 27, 1995

[54] TRIPPING DEVICE FOR A SAFETY DEVICE FOR PROTECTING VEHICLE OCCUPANTS

[75] Inventors: Guido Wetzel, Böblingen; Manfred Müller, Deizisau; Michael Meyer, Sindelfingen; Ulrich Tschäschke, Ehningen, all of Germany

[73] Assignee: Mercedes-Benz AG, Stuttgart, Germany

[21] Appl. No.: 112,236

[22] Filed: Aug. 25, 1993

[30] Foreign Application Priority Data

Aug. 25, 1992 [DE] Germany .............. 42 28 152.0

[51] Int. Cl.⁶ .................. B60R 21/16; B60R 21/32
[52] U.S. Cl. ................... 364/424.05; 307/10.1; 340/436; 280/735; 180/274
[58] Field of Search ............. 364/424.05; 280/734, 280/735; 307/9.1, 10.1; 340/436, 438, 669; 180/274, 282

[56] References Cited

U.S. PATENT DOCUMENTS

| | | | |
|---|---|---|---|
| 3,851,305 | 11/1974 | Baba et al. | 340/52 H |
| 3,889,232 | 6/1975 | Bell | 307/10.1 |
| 5,072,966 | 12/1991 | Nishitake et al. | 280/734 |
| 5,081,587 | 1/1992 | Okano | 364/424.05 |
| 5,172,790 | 12/1992 | Ishikawa et al | 280/735 |
| 5,189,311 | 2/1993 | Moriyama et al. | 364/424.05 |
| 5,202,831 | 4/1993 | Blackburn et al. | 364/424.05 |
| 5,229,943 | 7/1993 | Eigler et al. | 364/424.05 |
| 5,261,506 | 11/1993 | Jost | 180/282 |
| 5,262,949 | 11/1993 | Okano et al. | 364/424.05 |
| 5,262,949 | 11/1993 | Okano et al. | 364/424.05 |
| 5,281,780 | 1/1994 | Haland | 180/274 |
| 5,301,772 | 4/1994 | Honda | 280/735 |
| 5,307,896 | 5/1994 | Taguchi et al. | 180/274 |
| 5,322,323 | 6/1994 | Ohno et al. | 280/735 |
| 5,338,062 | 8/1994 | Kiuchi et al. | 280/735 |

FOREIGN PATENT DOCUMENTS 0531989  10/1992  European Pat. Off. .
0531989A1 3/1993  European Pat. Off. .

Primary Examiner—Kevin J. Teska
Assistant Examiner—Tyrone V. Walker
Attorney, Agent, or Firm—Evenson, McKeown, Edwards & Lenahan

[57] ABSTRACT

A tripping device for a safety device, such as a lateral air bag for protecting vehicle occupants in the event of a side crash evaluates for the purpose of reliable tripping of the safety device in the event of a dangerous side crash and effectively avoiding spurious tripping, the signals of a deformation sensor arranged in the lateral region of the vehicle, and a transverse acceleration sensor arranged on the vehicle longitudinal axis. In the event of the presence of a deformation signal, an acceleration evaluator is started and the tripping sensitivity is increased. The deformation rate is determinable from the signal of the deformation sensor, and an increase in the tripping sensitivity is stronger in the event of a crash when the deformation rate is higher.

6 Claims, 2 Drawing Sheets

TRIPPING DEVICE FOR A SAFETY DEVICE FOR PROTECTING VEHICLE OCCUPANTS

BACKGROUND AND SUMMARY OF THE INVENTION

The present invention relates to a tripping device for a safety device for protecting vehicle occupants in the event of a side crash of a vehicle, and has a deformation sensor arranged either in or directly behind an outer skin in a lateral region of the vehicle and that determines a deformation rate, a central transverse acceleration sensor mounted on a longitudinal axis of the vehicle, and an evaluation circuit. The evaluation circuit is coupled to the deformation sensor and the transverse acceleration sensor and is responsive to electrical signals from the deformation sensor and the transverse acceleration sensor to trip the safety device in the event of a dangerous crash of the vehicle.

Passive safety devices which in the event of an accident are tripped without the help of the vehicle occupants have long been known, including the air bag system, which has meanwhile been installed in mass production in motor vehicles and in which an air cushion is inflated automatically in the event of a crashing of the vehicle against an obstacle. These mass produced air bags are generally frontal crash systems which are intended to protect the driver and front passenger from a hard impact against the steering wheel, the windshield or the dashboard.

Furthermore, it is also known for air bag systems to be arranged on the vehicle side panels or doors in order to improve the protection of the vehicle occupants in the event of a side collision of the vehicle. In the ideal case, the lateral air bag has a relatively large volume in the inflated and deployed state and extends over the entire height of the side panel or door and covers a window opening.

Since in the lateral region motor vehicles have only minimal deformation zones which are able to absorb a portion of the collision energy, the period available for bringing the lateral air bag into a protectively effective state is very much shorter than in the event of a frontal crash. Consequently, high demands for a quick and reliable response are placed on a sensor and an evaluation circuit for detecting a side crash.

U.S. Pat. No. 3,851,305 discloses a tripping circuit for detecting a frontal crash and an oblique crash, which evaluates the signals of a crash sensor arranged in the front region of the vehicle and of a central acceleration sensor. The tripping circuit transmits a signal for tripping to the safety device as soon as the acceleration signal overshoots a threshold value. The threshold value is influenced, in turn, by the crash sensor in such a way that when a crash is recorded the threshold value is reduced. The reduction follows a prescribed temporal characteristic, in which the threshold value reassumes the initial value after a predetermined time. Although this tripping circuit could also be used in conjunction with a crash sensor mounted in the lateral region of the vehicle, an adaptation to the very time-critical conditions of detecting a side crash by a low tripping threshold would clearly increase the risk of undesired tripping due to a transverse acceleration that was strong, but lasted only briefly and was not dangerous.

Furthermore, German Pat. No. Document DE-A-3,716,168 describes a deformation sensor which is arranged below the outer skin in the lateral region of the vehicle and extends over the entire width of a door. The deformation sensor is constructed from two signal elements which are arranged at a short separation one behind another and respond one after another as soon as the outer skin is deformed by an external effect. Proposals for the signal elements are, on the one hand, light pipes which trip a signal in the event of a crash-induced functional disturbance, and, on the other hand, pressure transmitters in the bearings of structural elements in the lateral region of the vehicle. The time interval from the first signal to the signal of the second signal element depends on the given spatial separation of the two signal elements and on the rate at which an obstacle dents the motor vehicle. Using this measure of the deformation rate, it is possible (to a limited extent) to conclude there is an imminent danger to the occupants, with the result that given overshooting of a critical deformation rate the safety device is tripped. In this way, unnecessary tripping of the safety device is avoided when an obstacle deforms the outer skin of the vehicle very slowly, as is the case when the vehicle strikes an obstacle at low speed, the deformation certainly possibly being substantial.

In the use of the deformation sensor described above, disadvantages arise from the circumstance that the sensing is limited exclusively to the local deformation rate at the site of the quickest deformation. Specifically, the local deformation rate is not a variable which can be used to conclude unambiguously on the kinetic energy of the striking object. For example, an object with a small impact surface such as a hammer, can indent at a high local deformation rate and lead to tripping of the safety device, although its kinetic energy is very far from sufficient, after expiry of the first deformation phase, to impart to the vehicle a transverse acceleration which could be dangerous to the occupants.

It is an object of the invention to construct a tripping device of the above-described type, which responds quickly and reliably in the event of a side crash which is dangerous for the occupants, but on the other hand rules out an undesired tripping caused for example by a hammer strike or a collision which is not dangerous.

This and other objects are achieved by the present invention which provides a tripping device for a safety device for protecting vehicle occupants in the event of a side crash of a vehicle, and has a deformation sensor arranged either in or directly behind an outer skin in a lateral region of the vehicle and that determines a deformation rate, a central transverse acceleration sensor mounted on a longitudinal axis of the vehicle, and an evaluation circuit. The evaluation circuit is coupled to the deformation sensor and the transverse acceleration sensor and is responsive to electrical signals from the deformation sensor and the transverse acceleration sensor to trip the safety device in the event of a dangerous crash of the vehicle. The evaluation circuit includes a deformation evaluator that receives and processes the signals of the deformation sensor and transmits a trigger signal in the event of a critical deformation, an acceleration evaluator coupled to the deformation evaluator and the transverse acceleration sensor, the acceleration evaluator receiving and conditioning the signal from the transverse acceleration sensor by weighted integration, so that integration is started by the trigger signal of the deformation evaluator, and a comparator coupled to the acceleration evaluator and which compares the conditioned signal with a prescribed threshold value and transmits a tripping signal to the tripping device upon overshooting of the threshold value.

The aforementioned objects are also achieved by another embodiment of the present invention which provides a tripping device for a safety device for protecting vehicle occupants in the event of a side crash of a vehicle, and has a deformation sensor arranged either in or directly behind an outer skin in a lateral region of the vehicle and that determines a deformation rate, a central transverse acceleration sensor mounted on a longitudinal axis of the vehicle, and an evaluation circuit. The evaluation circuit is coupled to the deformation sensor and the transverse acceleration sensor and is responsive to electrical signals from the deformation sensor and the transverse acceleration sensor to trip the safety device in the event of a dangerous crash of the vehicle. The evaluation circuit includes a deformation evaluator that receives and processes the signals of the deformation sensor and transmits a control signal corresponding to the deformation rate in the event of a critical deformation, an acceleration evaluator coupled to the transverse acceleration sensor and that conditions the acceleration signal, a comparator coupled to the acceleration evaluator and which compares the conditioned signal with a prescribed threshold value and transmits a tripping signal to the tripping device upon overshooting of the threshold value, and a threshold generator coupled to the deformation evaluator and that prescribes the threshold value to the deformation evaluator as a function of control signals provided to an input of the threshold generator, the prescribed threshold value being reduced in the event of a critical deformation, the reduction being the greater the higher the determined deformation rate.

The tripping device according to the invention ensures that a quickly indenting object trips the safety device only if its kinetic energy also suffices to impart to the vehicle a significant and lasting transverse acceleration. The integration of the acceleration signal prevents the safety device from being tripped by an acceleration pulse which is strong but only brief. On the other hand, the system reacts very quickly because the integration is started by a signal from the deformation sensor. Furthermore, it can be provided that the tripping sensitivity is increased in the event of a critical impact recorded by the deformation sensor, as a result of which the response time is also shortened.

Certain embodiments of the invention advantageously use a known deformation sensor which is suitable for determining the deformation rate and is described, for example, in German Patent No. Document DE-A-3,716,168 A1. According to the invention, the enhancement in the tripping sensitivity, occurring in a crash, depends on the deformation rate specifically more strongly the higher the determined deformation rate. As a result, a deformation which, although slow, is strong, is prevented from initiating an unnecessarily strong enhancement of the tripping sensitivity. On the other hand, a quick response is ensured in the event of a rapid deformation. The tripping sensitivity is thus matched to the time which is available for a tripping decision. In the event of a quick deformation, priority attaches to a quick response and, in the event of a slow deformation, to the avoidance of spurious tripping.

Other objects, advantages and novel features of the present invention will become apparent from the following detailed description of the invention when considered in conjunction with the accompanying drawings.

DETAILED DESCRIPTION OF THE DRAWINGS

Figure 1:
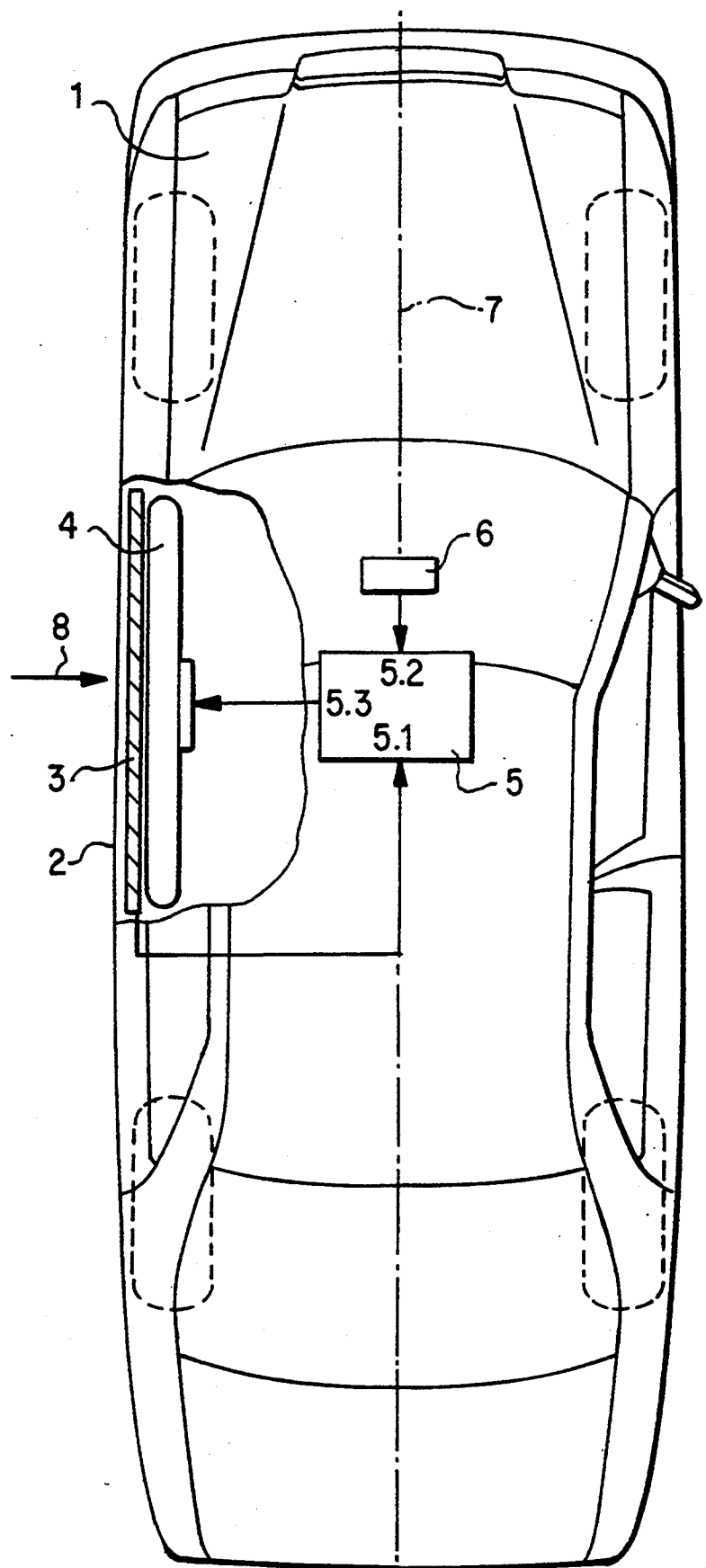
FIG. 1 shows a plan view of a motor vehicle with the tripping device constructed according to an embodiment of the present invention.

FIG. 1 shows, greatly simplified, the plan view of a motor vehicle 1 having four indicated wheels and a tripping device according to the invention for a safety device, here a lateral air bag 4, which is installed in the front left-hand side door. The tripping device comprises a deformation sensor 3 and a transverse acceleration sensor 6 which use an electric signal to drive the inputs 5.1 and 5.2 of the evaluation circuit 5. When needed, the evaluation circuit 5 transmits a tripping signal 5.3 for triggering the lateral air bag 4.

The deformation sensor 3 (known per se) in FIG. 1 comprises in a first embodiment a single pressure-sensitive signal element, for example a contact switching film which is mounted on a support element just below the outer skin 2 and extends over the width of the door. In the event of a side crash 8, the outer skin 2 is deformed and the signal element situated below it is addressed, which transmits a deformation signal 5.1 to the evaluation circuit. In this embodiment, the signal element records only one crash. Furthermore, a development of the tripping device requires a deformation sensor 3 in a second embodiment, which is capable of sensing not only a crash but also a deformation rate. Such a deformation rate sensor is described in the German Patent Document DE-A-3,716,168 already mentioned above. Other embodiments such as inductive transmitters, for example, are also conceivable.

The transverse acceleration sensor 6 senses the transverse acceleration of the motor vehicle 1, which is possibly caused by a side crash 8. The transverse acceleration sensor 6 is arranged on the longitudinal axis 7 of the motor vehicle 1, possibly at the level of the lateral air bag 4, at the center of the vehicle or at the center of gravity of the vehicle. Acceleration sensors have long been known and are used in mass production for the purpose of detecting a frontal crash. Piezoelectric acceleration sensors have proved effective in practice for time-critical applications, such as tripping lateral air bags.

Figure 2:
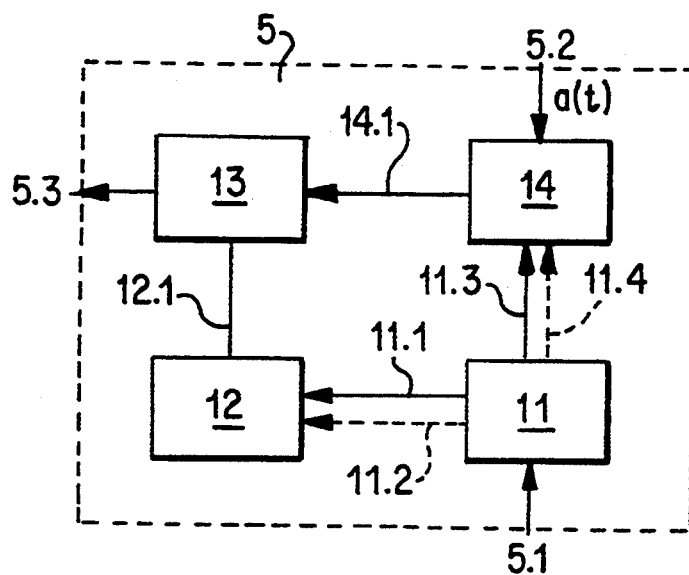
FIG. 2 shows a block diagram of the evaluation circuit of the present invention.

FIG. 2 shows in a block diagram how the evaluation circuit 5 is constructed. The tripping signal 5.3 for the lateral air bag 4 is provided at the output of a comparator 13 as soon as the working signal 14.1 overshoots a prescribed threshold value. The working signal 14.1 is obtained by an acceleration evaluator 14 from the acceleration signal 5.2 a(t). A deformation evaluator 11 is provided for the purpose of evaluating the deformation signal 5.1. In the event of a crash, the deformation evaluator 11 transmits a trigger signal and in conjunction with a deformation rate sensor also transmits a control signal which corresponds to the deformation rate.

In a first exemplary embodiment, the acceleration signal 5.2 is integrated over time in the acceleration evaluator 14, and a working signal 14.1 is thus formed which corresponds to a rate change of dv. This type of averaging over time takes account of the fact that an acceleration endangering the occupants also has to last a certain time. In order for the comparator 13 to transmit a tripping signal 5.3, the working signal 14.1 must overshoot the threshold value within a specific time after the start of integration. This time is given by the resetting time $t_R$ after the expiry of which integration ceases, the integral is returned to zero and the system reverts to its initial state. The time interval given by $t_R$ is yielded by the time within which a tripping decision must be taken, so that after a crash which still continues to be dangerous the safety device can be brought into a protectively effective state.

A similar method for conditioning an acceleration signal is described in German Patent 2,222,038. However, there integration begins when a specific acceleration value (interground threshold) is overshot. Such a method is too slow for detecting a side crash, since integration is not started until after an integration threshold has been overshot. It is therefore provided according to the invention that integration is started immediately after the instant of crash detection by the deformation sensor 3. This is achieved by a corresponding trigger signal 11.3 from the deformation evaluator 11 to the acceleration evaluator 14. The parallel maintenance of the integration threshold at the start of integration can, furthermore, be sensible in order to permit tripping independently of deformation detection, if, for example, the deformation sensor was not hit in the event of a side crash.

If a quick response of the tripping device is desired, it is advantageous for the acceleration signal a(t) 5.2 to be weighted in the acceleration evaluator 14 by a non-linear characteristic before integration. As a result, higher acceleration values make a disproportionately high contribution to the integral, and the tripping threshold is reached more quickly.

In an embodiment of the invention, the threshold value 12.1 is not constant, but is prescribed for the comparator 13 as a crash function by a threshold value generator 12. In the event of a crash, the deformation evaluator 11 transmits a trigger signal 11.1 to the threshold value generator 12, whereupon the threshold value 12.1 is reduced, and this effects an increase in the tripping sensitivity. The reduction is temporarily limited, and after the reset time $t_R$ at the latest, the threshold value 12.1 is returned to its initial value. The temporal characteristic of the threshold value 12.1 is prescribed and can, for example, be taken from the above-mentioned U.S. Pat. No. 3,852,305.

Further exemplary embodiments use a deformation sensor 3 of the second type of embodiment, from whose deformation signal 5.1 the deformation evaluator 11 determines a deformation rate. In a further development of the preceding exemplary embodiments, a control signal corresponding to the deformation rate is used in accordance with the invention in order to increase the tripping sensitivity and rate of response of the determined deformation rate in a corresponding fashion. Thus, a control signal 11.4 can be used to influence the weighting characteristic of the acceleration evaluator 14 to the fact that high acceleration values are weighted more strongly the higher the deformation rate. Secondly, a corresponding control signal 11.2 of the threshold value generator 12 can be influenced so that the reduction in the threshold value 12.1 is amplified in the event of a crash with a high deformation rate. This can be implemented in such a way that given a very high deformation rate a very slightly increased integral leads to quick tripping.

An even quicker tripping can be achieved by giving up integration entirely and merely filtering the acceleration signal a(t) 5.2 in the acceleration evaluator 14 and, possibly, multiplying it by a nonlinear characteristic. Tripping requires the acceleration signal thus conditioned to overshoot the threshold value 12.1, which here (unlike in the above-mentioned U.S. Pat. No. 3,851,305) depends on the deformation rate. If the initial value of the threshold value 12.1 is set high enough to exclude tripping by an acceleration signal a(t) 5.2 alone, the acceleration evaluator 14 is equivalent to an AND operation. The point is that tripping by means of reducing the threshold value 12.1 is not rendered possible until the simultaneous presence of a deformation signal 5.1.

Figure 3:
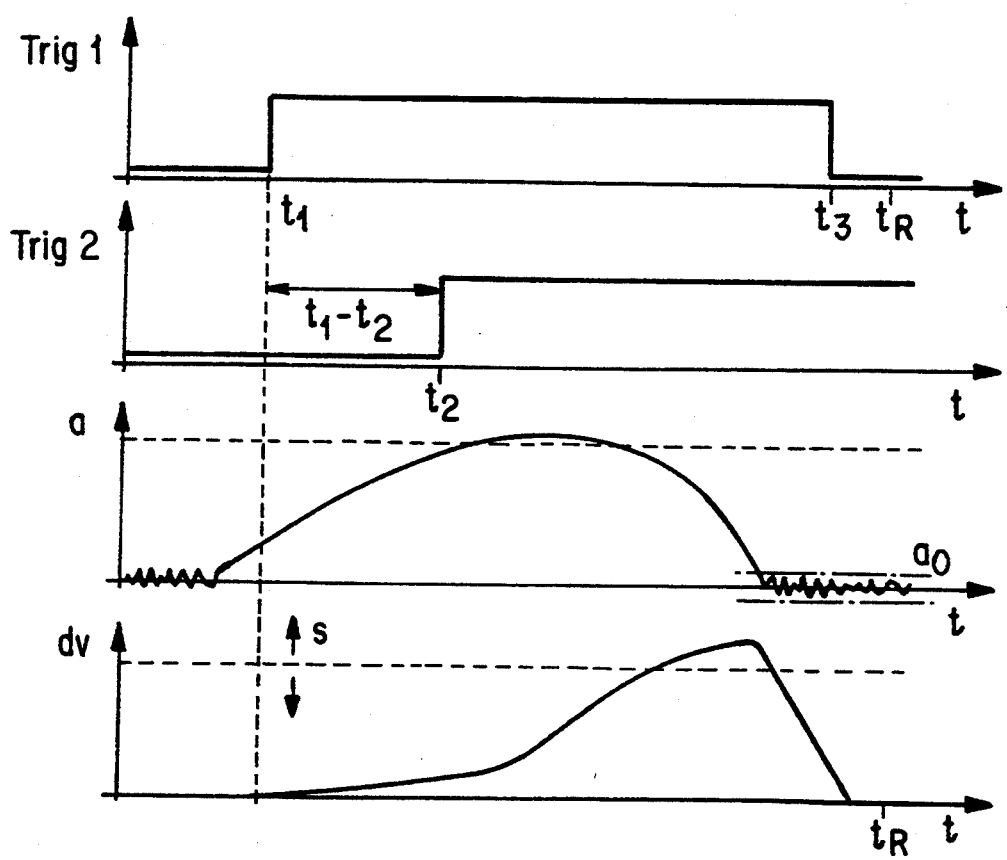
FIG. 3 shows diagrams relating to the various temporal signal characteristics for an exemplary embodiment.

Various signal characteristics are plotted against time t in FIG. 3 for the purpose of illustrating and explaining further properties of the tripping device. In the event of a crash, a deformation sensor 3 comprising two signal elements arranged one behind another, for example as specified in German Pat. No. Document DE-A-3,716,168, transmits a deformation signal 5.1 consisting of two successive signals to which the two signals Trig 1 and Trig 2 correspond. The temporal interval $t_1 - t_2$ between the first and second signal is a measure of the deformation rate, and is smaller the higher the deformation rate.

Furthermore, the third signal characteristic exhibits an acceleration signal a(t) 5.2, such as was recorded simultaneously by the acceleration sensor 6. The horizontal dashed line indicates a threshold value S which the acceleration signal a(t) would have to overshoot to trip the safety device for the case in which only the acceleration signal a(t) was used for the purpose of a tripping decision.

The fourth signal characteristic shows a working signal or speed signal dv 14.1 obtained by integration from the acceleration signal a(t) 5.2. Integration of the acceleration a(t) is started with the aid of the first trigger signal Trig 1. The variable threshold value S is also represented in this diagram by a horizontal dashed line. The safety device is tripped at the intersection of the acceleration integral with the threshold value S. As soon as the trigger signal Trig 2 is also present, the threshold value S is reduced, specifically the more so the shorter the time difference $t_1 - t_2$. Consequently, the integral of the acceleration required for tripping is low given a high deformation rate. This can go so far that tripping can be performed virtually immediately given a sufficiently small time difference $t_1 - t_2$. A short time difference means a high deformation rate, and thus a high risk potential for the occupants, for which reason in this case the device according to the invention accords quick tripping priority over reliable exclusion of spurious tripping.

A further important detail relates to the resetting of the acceleration integral to zero and of the threshold value to its initial value. This is important in order after an error-induced trigger signal Trig 1 to exclude unlimited integration of acceleration values, which would lead to undesired tripping. Resetting is performed at the latest at a reset time $t_R$. However, resetting is also provided at an earlier time, specifically when the crash can be regarded as having ceased and it is desirable to be ready quickly to detect a possible follow-up collision. Premature resetting is performed when the first deformation signal Trig 1 is taken back to a time $t_3 < t_R$. The vehicle has then disengaged from the collision partner and no further acceleration energy endangering the occupants can be transmitted. As represented in FIG. 3, premature resetting is also performed when the acceleration signal a(t) has decreased so strongly at the end of a crash that in terms of-absolute size it undershoots a threshold $a_0$ selected to be correspondingly small. The collision process can then also be regarded as having ceased.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Tripping device for a safety device for protecting vehicle occupants in the event of a side crash of a vehicle, comprising:
   a deformation sensor arranged either in or directly behind an outer skin in a lateral region of the vehicle and that determines a deformation rate;
   a central transverse acceleration sensor mounted on a longitudinal axis of the vehicle;
   an evaluation circuit coupled to the deformation sensor and the transverse acceleration sensor and responsive to electrical signals from the deformation sensor and the transverse acceleration sensor to trip the safety device in the event of a dangerous crash of the vehicle, said evaluation circuit including:
      a deformation evaluator that receives and processes the signals of the deformation sensor and transmits a trigger signal in the event of a critical deformation,
      an acceleration evaluator coupled to the deformation evaluator and the transverse acceleration sensor, the acceleration evaluator receiving and conditioning the signal from the transverse acceleration sensor by weighting the signal and then integrating the signal, such that integration is started by the trigger signal of the deformation evaluator, and
      a comparator coupled to the acceleration evaluator and which compares the conditioned signal with a prescribed threshold value and transmits a tripping signal to the tripping device upon overshooting of the threshold value.

2. Tripping device according to claim 1, further comprising a threshold value generator that prescribes the threshold value as a function of a trigger signal, the threshold value generator being coupled to an input of the deformation evaluator such that a critical deformation effects a reduction in the threshold value.

3. Tripping device according to claim 1, wherein the deformation rate is determinable from the signals of the deformation sensor, and the deformation evaluator transmits to the acceleration evaluator a control signal which corresponds to the deformation rate and influences the integration of the acceleration signal such that high acceleration values are weighted more strongly the higher the determined deformation rate.

4. Tripping device according to claim 2, wherein the deformation rate is determinable from the signals of the deformation sensor, and the deformation evaluator transmits to the threshold value generator a control signal which corresponds to the deformation rate and amplifies a reduction in the threshold value the higher the determined deformation rate.

5. Tripping device for a safety device for protecting vehicle occupants in the event of a side crash of a vehicle, comprising:
   a deformation sensor arranged either in or directly behind an outer skin in a lateral region of the vehicle and that determines a deformation rate;
   a central transverse acceleration sensor mounted on a longitudinal axis of the vehicle and providing acceleration signals;
   an evaluation circuit coupled to the deformation sensor and the transverse acceleration sensor and responsive to electrical signals from the deformation sensor and the transverse acceleration sensor to trip the safety device in the event of a dangerous crash of the vehicle, said evaluation circuit including:
      a deformation evaluator that receives and processes the signals of the deformation sensor and transmits a control signal corresponding to the deformation rate in the event of a critical deformation,
      an acceleration evaluator coupled to the transverse acceleration sensor and that conditions the acceleration signal,
      a comparator coupled to the acceleration evaluator and which compares the conditioned signal with a prescribed threshold value and transmits a tripping signal to the tripping device upon overshooting of the threshold value, and
      a threshold generator coupled to the deformation evaluator and that prescribes the threshold value to the comparator evaluator as a function of control signals provided to an input of the threshold generator, the prescribed threshold value being reduced in the event of a critical deformation, the reduction being the greater the higher the determined deformation rate.

6. Tripping device according to claim 1, wherein resetting to zero an integral formed in the acceleration evaluator, and/or resetting the reduced threshold value to its initial value are performed at the latest after a resetting time $t_R$ and prematurely if the deformation signal has been taken back again or the acceleration signal undershoots a threshold $a_0$ in terms of absolute size.

* * * * *